Patented Dec. 1, 1936

2,062,996

UNITED STATES PATENT OFFICE 2,062,996

INSULATING MATERIAL

Johannes Leppik, New York, N. Y., assignor to Telsit Insulation Corporation, New York, N. Y., a corporation of Delaware No Drawing. Application April 22, 1933, Serial No. 667,507

1 Claim. (Cl. 106—18)

The present application, which is a continuation in part of my application Serial Number 628,897, now Patent 2,036,877, relates to novel insulation material and more particularly relates to novel heat insulation material and methods of making the same.

There are, as is well known, many heat insulators on the market. Those that have a low thermal conductivity are very expensive or too heavy or combustible at relatively low temperatures or have a combination of these disadvantages. A good insulator should be inexpensive light in weight, have a high combustion temperature, and in addition be plastic and elastic.

Accordingly, I have as the main object of my invention an insulation composition which has all the desirable properties of a good insulation and a novel method of making and of applying the same to the object to be insulated.

Other objects of my invention will appear with the detailed description which is to follow.

In making my insulation, I take the waste product obtained from hemp, particularly the so-called Russian hemp. This waste product of the hemp plant is obtained from the remains after the fibers for making rope such as tarred hemp rope, rough cloth, sacks or canvas have just been extracted. The hemp plant, after it has been cut and the seeds removed, is placed in water for from three to five days and then permitted to bleach in the air. It is then dried and passed through a crushing machine to remove the fibers. After the fibers have been extracted, there remains as waste product, small crushed pieces of the stem which I shall call "crushed stem fines" and the fine fibrous particles. This has heretofore been discarded as a waste product.

Alternatively I may use the waste product of flax, such for example as Russian or Belgium flax used for linen. This waste product is obtained after the flax strands for making linen and cloth have been extracted substantially in the manner described in the case of hemp. I have found that this waste of both hemp and flax is far superior product than manila hemp or flax strands themselves or similar fibers, particularly when this waste is used in conjunction with other constituents now to be described. This waste product is, of course, much cheaper as it has heretofore been considered useless.

I have discovered that instead of using hemp or flax alone, better results are obtained by a mixture of the two.

One of the ingredients of my insulation is sawdust, obtained from trees whose wood is very light and substantially free from tar and oils. Such trees are spruce, pine, cedar and elm, but I have found that the shavings or finely crushed particles of balsa wood is far superior. I have further discovered that if I take the shavings and sawdust of these trees and boil them, their desirable property of acting as a binder for the insulation ingredients is considerably improved.

To this I add ordinary milled paper such as newspaper or paper pulp. This swells when moisture is added and subsequently when the insulation is dried, still air pockets are formed to further increase the insulation properties.

The necessary adherence of the insulation to the objects to be insulated, such as pipes, is obtained from a special fatty, plastic clay which is entirely free from any grit or sand or any other alkali. Such a clay is found in the pure clay obtained from China, but may also be obtained from other places. When it is wet, the clay will act as a glue to bind the constituents of my insulation. These ingredients are mixed together in the following ratio by volume, based on a predetermined amount of clay:

| | |
|---|---|
| Pure clay | 0.8 to 1.3 |
| Waste hemp fines, or flax fines, or a mixture of the two | 1.5 to 2.5 |
| Asbestos | 1.5 to 2.5 |
| Balsa wood dust, fine shavings, or particles | 4.5 to 8.0 |
| Milled paper | 1.2 to 2.2 |

Expressed as a direct ratio of the clay, these figures are:

| | |
|---|---|
| Waste hemp | 1.88 to 1.92 |
| Balsa wood | 5.62 to 6.16 |
| Milled paper | 1.50 to 1.69 |
| Clay | 1.00 to 1.00 |
| Asbestos | 1.88 to 1.92 |
| Total volume | 11.88 to 12.69 |
| Percent clay present | 8.4% to 7.9% |

The limits of the ratio of the mixtures is in general determined on the one hand by the stresses and strains to which the insulation is subjected and on the other hand by the insulation qualities desired.

The clay must be present in sufficient quantities to insure mechanical strength. Where the insulation is subjected to considerable vibration, jarring or other mechanical strain, the higher ratio of clay to other constituents, obtained in the left hand, column, is used.

Where insulation need not be sacrificed to such extreme mechanical strength, the lower ratio of clay to other constituents obtained in the right hand column is used.

Obviously these limits may be varied somewhat, although I have discovered that if the ratio of clay is increased much beyond that of the left hand column, the quality of the insulation decreases rapidly. On the other hand, any substantial decrease of the ratio of the clay beyond the right hand column so mechanically weakens the insulation that it tends to crumble, although the insulation property increases. In that case, pulverized insulation is obtained.

The mixture obtained is well kneaded by adding water until it is of a gruel or fresh mortar consistency.

In order to improve the insulation properties, I have discovered that if I permit this gruel to dry and then mill it until it becomes a mass of fine particles, the subsequent addition of water until the gruel or mortar is again formed will result in a better insulation product having a lower heat conductivity and being more plastic than is otherwise possible.

The fresh mixture has a viscous consistency, so that it can be readily applied to objects such as steam pipes, boilers, etc., which are to be insulated. It thereafter dries and is heated, solidifying to form a mold-like coating around the pipe.

As the water in the insulation evaporates, there is substantially no contraction of the insulation composition. This is particularly true when the insulation has been applied to the device such as a steam pipe to be insulated. In this case, the heat comes from one side of the insulation. I have discovered that due to the novel unitary construction of my insulation, as the water is driven off in the form of steam, the minute air cells are formed and held in place by the dried clay now free of its fatty oil constituency. Substantially no contraction results except that the insulation is just sufficiently flexible so that it undergoes the little necessary contraction and expansion to follow the changes in the steam pipe or plates themselves.

I have discovered that if I first roast or burn the insulation, I can raise the fusion temperature of the insulation considerably. Recent tests have shown the fusion temperature, the temperature at which marked flow begins, to be above 2300° F.

When, therefore, the insulation is to be applied to surfaces where it will be subjected to very high temperatures, it is molded in the necessary shape to be directly applied to the surface to be insulated and then baked or burnt. It is then applied in molded form.

These molds, however, need not be of the full thickness, as I may for added thickness of insulation apply to the molded insulation, further layers of the gruel bulk insulation which will then dry and result in one continuous insulation body. At the point of high temperature, the high temperature insulation is used, and at the lower temperatures, the insulation fusible at lower temperatures is used.

At recent tests, this insulation, with the temperature on the hot side being 119.6° F. and on the cold side 64.4° F., was found to have a thermal conductivity of .46, the thermal conductivity being the amount of heat in B. t. u. which will flow through one square foot of the material in one hour, if the temperature drop through the material is one degree Fahrenheit per inch thickness.

Although best results have been obtained with the above described insulation, very good results are obtained with an insulation of the following analysis:

Balsa wood fine particles_____ 4.0 to 10.5
Asbestos_____ 1.2 to 2.5
Clay_____ 0.8 to 1.3

Here the insulation properties of the hemp or flax fines and of the milled paper is replaced by the balsa wood.

I may water proof my insulation by an outer coating consisting of pure clay, cement, milled paper and water, in the following ratio:

|  | Voluminal parts |
|---|---|
| Plastic fatty clay | 1.0 to 1.5 |
| Milled paper | 2.0 to 3.0 |
| Cement | 2.5 to 3.5 |

Water to bring about a gruel-like mass.

In addition to coating insulation, this water proofing has also been found very desirable for cementing tanks, ships bilges, floors and walls, coating iron pipes to prevent rust and corrosion.

Although I have described preferred forms of my insulation and water proofing, it will be obvious that the ratios herein given for illustration can be varied within the spirit of my invention. It will also be understood that it may be produced or manufactured in pulverized bulk or in molded form in molds or blocks. Furthermore, although I have illustrated my invention as an insulation, it has other uses such as for sound proofing, cementing, etc., and I do not intend to limit myself except as set forth in the appended claim.

I claim:

A mixture for kneading with water to form a plastic heat insulating composition consisting by volume ratio:

Pure clay_____ 0.8 to 1.3
Waste hemp fines_____ 1.5 to 2.5
Balsa wood fine particles_____ 4.5 to 8.0
Milled paper_____ 1.2 to 2.2
Asbestos_____ 1.2 to 2.5

JOHANNES LEPPIK.